United States Patent [19]

Fukushima

[11] 4,381,043

[45] Apr. 26, 1983

[54] ENGINE MOUNTING STRUCTURE

[75] Inventor: Masao Fukushima, Fuchu, Japan

[73] Assignee: Nissan Motor Company, Limited, Yokohama, Japan

[21] Appl. No.: 228,206

[22] Filed: Jan. 26, 1981

[30] Foreign Application Priority Data

Feb. 1, 1980 [JP] Japan .................................. 55-11787

[51] Int. Cl.³ ...................... B60K 5/012; F16F 15/002
[52] U.S. Cl. ............................... 180/300; 123/192 R;
244/54; 248/559; 267/136; 267/141; 267/141.2;
267/152
[58] Field of Search ............. 180/300, 54 A; 188/321;
123/192 R; 248/638, 627, 606, 559, 580; 267/54
B, 54 C, 136, 140, 141, 151, 152, 153, 141.2;
244/54

[56] References Cited

U.S. PATENT DOCUMENTS

| 2,034,764 | 3/1936 | Lee ....................................... 248/606 |
| 3,402,782 | 9/1968 | Ljungstrom .................... 180/300 X |
| 3,447,638 | 6/1969 | Schilberg ................................. 188/1 |
| 3,825,090 | 7/1974 | Runkle et al. ................... 180/300 X |

FOREIGN PATENT DOCUMENTS

| 2632574 | 1/1978 | Fed. Rep. of Germany ...... 248/559 |
| 729978 | 8/1932 | France . |
| 1181260 | 6/1959 | France . |
| | | (Addition to No. E 72796) |
| 172537 | 8/1960 | Sweden ............................... 267/152 |
| 1026358 | 4/1966 | United Kingdom ................ 248/559 |
| 1091778 | 11/1967 | United Kingdom . |
| 1295171 | 11/1972 | United Kingdom ................ 267/136 |

Primary Examiner—David M. Mitchell
Assistant Examiner—Mitchell J. Hill
Attorney, Agent, or Firm—Lane, Aitken & Kananen

[57] ABSTRACT

An engine mounting structure characterized in that a shock and vibration insulating unit and a vibration cancelling device are provided operatively in parallel with each other between the body structure of an automotive vehicle and the engine mounted on the vehicle body structure, wherein the vibration cancelling device comprises at least one rigid elongated bar having one end portion pivotally engaged by the body structure of the engine and a longitudinally intermediate portion pivotally engaged by the vehicle body structure, and a mass or counterweight member carried by another end portion of the elongated bar whereby the vibrations to be transferred through the shock and vibration insulating unit are at least partially cancelled by the vibrations to be transferred through the vibration cancelling device.

8 Claims, 35 Drawing Figures

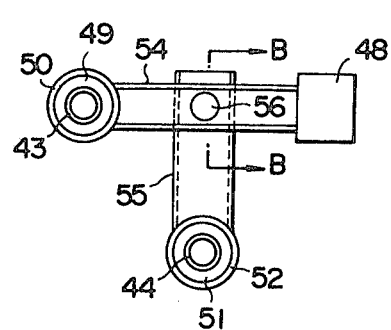
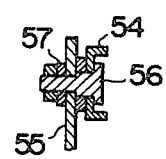
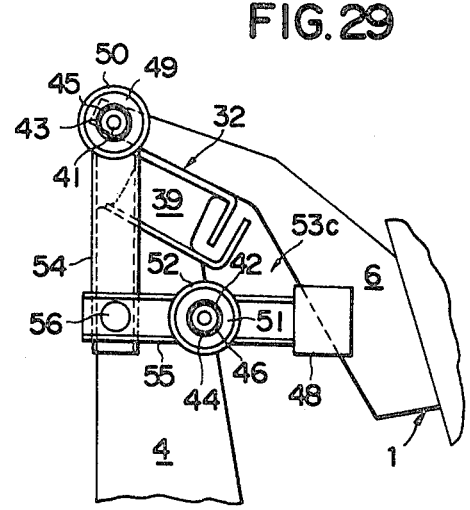

ENGINE MOUNTING STRUCTURE

FIELD OF THE INVENTION

The present invention relates to an engine mounting structure used for the mounting of a power plant such as an internal combustion engine on the body structure of an automotive vehicle.

BRIEF DESCRIPTION OF THE PRIOR ART

A conventional engine mounting structure used for the mounting of an engine on the body structure of an automotive vehicle comprise a shock and vibration insulating unit and a buffer rod assembly. The shock and vibration insulating unit is connected between a body-side bracket member secured to the body structure of a vehicle and an engine-side bracket member secured to the engine to be mounted on the vehicle body structure. The insulating unit is usually designed to have a relatively large spring constant so as to take up the vibrations to be transmitted from the engine during medium-speed cruising of the vehicle. The buffer rod assembly is operatively connected in parallel with such a shock and vibration insulating unit and is also arranged to be capable of dampening the vibrations to be transferred from the engine under medium-speed cruising conditions of the vehicle. Usually, furthermore, the buffer rod assembly is designed to have a resonance frequency higher than the range of the vibration frequencies of the engine operating under normal conditions.

During high-speed cruising of the vehicle, the engine tends to produce vibrations with frequencies usually ranging from about 120 to 170 Hz. Vibrations of the engine at such frequencies, in turn, tend to cause production of stifled, droning noises or "booms" in the vehicle cabin. Such noises can be reduced by reducing the spring constant of the shock and vibration unit of the engine mounting structure. Because, however, of the above described resonance frequency characteristic of the buffer rod assembly, the load transmitted through the buffer rod assembly to the body structure of the vehicle is added to the load transmitted through the shock and vibration insulating unit during high-speed cruising of the vehicle. The vibrations transmitted from the insulating unit to the vehicle body structure are, for this reason, amplified by the vibrations transmitted from the buffer rod assembly to the vehicle body structure under such operating conditions of the vehicle. The reduction in the noise as achieved by the reduction of the spring constant of the shock and vibration insulating unit is, therefore, more or less offset by the added vibrations thus transferred to the body structure of the vehicle through the buffer rod assembly.

The present invention contemplates overcoming these and other drawbacks which have thus far been inherent in prior-art engine mounting structures.

SUMMARY OF THE INVENTION

In accordance with the present invention, such an end is achieved basically in an engine mounting structure for mounting of an internal combustion engine on the body structure of an automotive vehicle, comprising a first bracket member to be connected to the body structure of the engine, a second bracket member to be connected to the body structure of the vehicle and spaced apart from the first bracket member, a shock and vibration insulating unit structurally intervening between the first and second bracket members and including at least one resilient block, and a vibration cancelling device comprising at least one rigid elongated member which has one end portion pivotally engaged by the first bracket member and a longitudinally intermediate portion pivotally engaged by the second bracket member, and a mass member carried by another end portion of the elongated member.

The vibration cancelling device may further comprise a first resilient member structurally intervening between one end portion of the elongated member and the first bracket member, and a second resilient member structurally intervening between the other end portion of the elongated member and the second bracket member.

BRIEF DESCRIPTION OF THE DRAWINGS

The drawbacks of prior-art engine mounting structures and the features and advantages of the engine mounting structure proposed by the present invention to eliminate such drawbacks will be more clearly understood from the following description taken in conjunction with the accompanying drawings in which like reference numerals designate similar or corresponding members and structures and in which:

FIG. 23 is a front elevation view of the vibration cancelling device illustrated in FIG. 22;

FIG. 24 is a cross section taken on a plane indicated by line B—B in FIG. 23;

FIG. 29 is a fragmentary front elevation view showing still another preferred embodiment of the engine mounting structure according to the present invention;

FURTHER DESCRIPTION OF THE PRIOR ART

Figure 1:
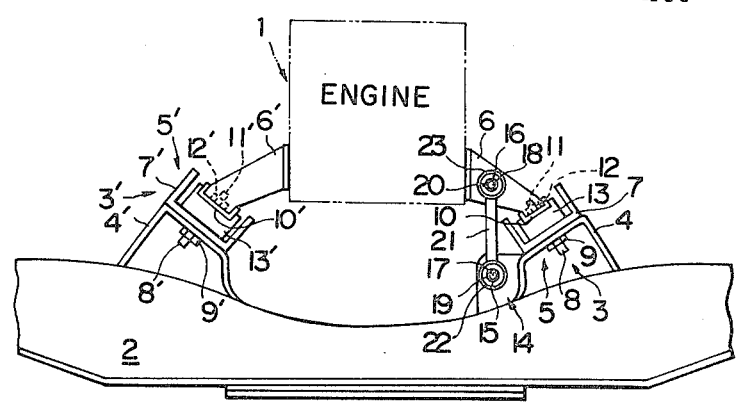
FIG. 1 is a front elevation view showing a representative example of the prior-art engine mounting arrangement.

For better understanding of the drawbacks which have been inherent in prior-art engine mounting structures, description will be hereinafter made with reference to FIG. 1 which shows a representative example of the conventional engine mounting arrangement. The engine mounting arrangement as shown is used for the mounting of an internal combustion engine 1 on a lateral suspension member 2 of the body structure of an automotive vehicle and comprises a pair of engine mounting structures 3 and 3' which are respectively disposed on both sides of the engine 1. The lateral suspension member 2 extends laterally of the vehicle body structure and is fixedly connected at the opposite ends thereof to right and left side members (not shown) of the vehicle body structure.

The engine mounting structures 3 and 3' comprise rigid body-side bracket members 4 and 4', respectively, positioned on both sides of and below the engine 1 and upstanding respectively from opposite longitudinal end portions of the suspension member 2. Each of the body-side bracket members 4 and 4' has two portions straddling on and secured to the suspension member 2 and an inclined intermediate portion intervening between the leg portions and having an upper face upwardly and sidewise confronting each of the opposite side faces of the body structure of the engine 1.

The engine mounting structures 3 and 3' further comprise shock and vibration insulating units 5 and 5' connected on one hand to the above mentioned body-side bracket members 4 and 4', respectively, and on the other hand to rigid engine-side bracket members 6 and 6', respectively, which are secured to the body structure of the engine 1.

The insulating unit 5 comprises a lower brace member 7 which is securely connected to the upper face of the inclined intermediate portion of the bracket member 4 by means of a bolt 8. Likewise, the insulating unit 5' comprises a lower brace member 7' securely connected to the upper face of the inclined intermediate portion of the body-side bracket member 4' by means of a bolt 8'. The bolts 8 and 8' are welded to the lower brace members 7 and 7', respectively, and project downwardly through holes (not shown) formed in the respective inclined intermediate portions of the bracket members 4 and 4'. The bolts 8 and 8' are secured to the bracket members 4 and 4' by means of nuts 9 and 9', respectively.

The insulating unit 5 further comprises an upper brace member 10 securely connected to the engine-side bracket member 6 by means of a bolt 11 and, likewise, the insulating unit 5' further comprises an upper brace member 10' securely connected to the engine-side bracket member 6' by means of a bolt 11'. The bolts 11 and 11' are welded to the upper brace members 10 and 10', respectively, and project upwardly through holes (not shown) formed in the engine-side bracket members 6 and 6'. The bolts 11 and 11' are secured to the engine-side bracket members 6 and 6' by means of nuts 12 and 12', respectively. The upper brace members 10 and 10' are spaced apart from the lower brace members 7 and 7', in directions upwardly slanting toward the opposite side faces of the body structure of the engine 1 as will be seen from FIG. 1.

Between the lower and upper brace members 7 and 10 of the insulating unit 5 is fixedly interposed a resilient block 13 of, for example, rubber having one end face bonded to the lower brace member 7 and another end face bonded to the upper brace member 10. Similarly, a resilient block 13' of, for example, rubber is fixedly interposed between the lower and upper brace members 7' and 10' of the insulating unit 5' and has one end face bonded to the lower brace member 7' and another end face bonded to the upper brace member 10'.

The engine-side bracket member 6 is securely connected at one end thereof to the upper brace member 10 of the insulating unit 5 by the bolt 11 and the nut 12 and at the other end thereof to one side face of the body structure of the engine 1 by means of a bolt or bolts (not shown). Likewise, the engine-side bracket member 6' is securely connected at one end thereof to the upper brace member 10' of the insulating unit 5' by the bolt 11' and the nut 12' and at the other end thereof to the other side face of the engine body by means of a bolt or bolts (not shown).

The engine 1 is, thus, mounted on the suspension member 2 of the vehicle body structure by means of the two engine mounting structures 3 and 3' including the shock and vibration insulating units 5 and 5', respectively. The material forming each of the resilient blocks 13 and 13' is selected to have such a spring constant that the resilient blocks 13 and 13' are capable of absorbing and dampening the shocks and vibrations which are to be produced in the vehicle body structure during cruising of the vehicle at medium speeds.

The prior-art engine mounting arrangement shown in FIG. 1 further comprises a buffer rod assembly 14 which is adapted to further take up the shocks and vibrations to be produced in the vehicle body structure during medium-speed cruising of the vehicle. The buffer rod assembly 14 is provided in association with one of the two engine mounting structures 3 and 3' such as, for example, the engine mounting structure 3 as shown, and is adapted to provide elastic reinforcement to the stiffness, in vertical direction, of both of the engine mounting structures 3 and 3'.

As is shown schematically in FIG. 1, the buffer rod assembly 14 comprises cylindrical lower and upper rigid sleeves 15 and 16 and bolts 17 and 18 passed through the sleeves 15 and 16, respectively. The bolt 17 passed through the lower rigid sleeve 15 is securely screwed into an extension of the body-side bracket member 4, while the bolt 18 passed through the upper rigid sleeve 16 is securely screwed into the engine-side bracket member 6. The bolts 17 and 18 are located on the bracket members 4 and 6, respectively, so that the respective center axes of the lower and upper rigid sleeves 15 and 16 are vertically spaced apart a predetermined distance from each other above a portion of the lateral suspension member 2.

The buffer rod assembly 14 further comprises cylindrical lower and upper resilient sleeves 19 and 20 which are coaxially secured to the lower and upper rigid sleeves 15 and 16, respectively. The lower resilient sleeve 19 has its inner peripheral surface bonded to the outer peripheral surface of the lower rigid sleeve 15, while the upper resilient sleeve 20 has its inner peripheral surface bonded to the outer peripheral surface of the upper rigid sleeve 16. Each of the lower and upper resilient sleeves 19 and 20 is constructed of, for example, rubber.

The buffer rod assembly 14 further comprises a buffer rod 21 having lower and upper sleeve portions 22 and 23 which are coaxially secured to the above mentioned lower and upper resilient sleeves 19 and 20, respectively. The lower sleeve portion 22 of the buffer rod 21 has its inner peripheral surface bonded to the outer peripheral surface of the lower resilient sleeve 19 and, likewise, the upper sleeve portion 23 of the rod 21 has its inner peripheral surface bonded to the outer peripheral surface of the upper resilient sleeve 20. The body-side and engine-side bracket members 4 and 6 of the engine mounting structure 3 are thus elastically connected together by means of the buffer rod assembly 14 including the resilient sleeves 19 and 20.

The respective spring constants of the resilient sleeves 19 and 20 and the weight of the buffer rod 21 are selected so that the longitudinal resonance frequency of the buffer rod 21 is higher than the range of the vibration frequencies of the engine 1 operating under normal conditions. In this connection, it may be mentioned that the vibration frequencies of an ordinary four-cylinder internal combustion engine range from 0 to about 200 Hz under normal operating conditions.

During high-speed cruising of the vehicle, the engine 1 tends to produce vibrations with frequencies of, for example, about 120 to 170 Hz. Vibrations of the engine 1 at such frequencies tend to cause production of stifled droning noises or "booms" in the vehicle cabin.

As has been noted above, the buffer rod assembly 14 is designed to be operative to take up the vibrations to be transmitted from the engine 1 during, particularly, middle-speed cruising of the vehicle. Such a function of the buffer rod assembly 14 permits the resilient block 13 of the insulating unit 5 to be constructed of materials having reduced spring constants so as to be capable of taking up the vibrations responsible for the production of the stifled droning noises in the vehicle cabin during high-speed cruising of the vehicle.

Because, however, of the above described resonance frequency characteristic of the buffer rod assembly 14, the load transmitted through the buffer rod assembly 14 to the body structure of the vehicle is added to the load transmitted through the shock and vibration insulating unit 5 to the vehicle body structure during high-speed cruising of the vehicle when booming noises tend to occur in the vehicle cabin. The vibrations transmitted from the insulating unit 5 to the vehicle body structure are therefore amplified by the vibrations transmitted through the buffer rod assembly 14 to the vehicle body structure. The added vibrations more or less offset the reduction of the noises achieved by the reduction of the spring constant of the resilient block 13 of the insulating unit 5.

Figure 2:
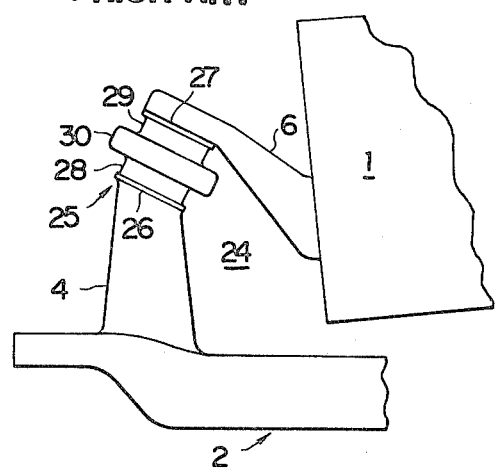
FIG. 2 is a fragmentary front elevation view showing another representative example of the prior-art engine mounting structure.

FIG. 2 shows part of another representative example of the conventional engine mounting arrangement. In the prior-art engine mounting arrangement herein shown, each of the engine mounting structures represented by reference numeral 24 comprises lower and upper bracket members 4 and 6 and a shock and vibration insulating unit 25. As in each of the engine mounting structures in the prior-art arrangement of FIG. 1, the lower bracket member 4 is secured to the suspension member 2 of the body structure of an automotive vehicle and the upper bracket member 6 is secured to the body structure of an internal combustion engine 1 installed in the vehicle body structure. In the engine mounting structure 24 shown in FIG. 2, the shock and vibration insulating unit 25 comprises lower and upper brace members 26 and 27 secured to the lower and upper bracket members 4 and 6, respectively, by means of bolts and nuts (not shown). The lower and upper brace members 26 and 27 are spaced apart from each other and have interposed therebetween a combination of a pair of resilient blocks 28 and 29 of, for example, rubber and a rigid mass member 30 sandwiched between the resilient blocks 28 and 29. The resilient blocks 28 and 29 are bonded to the lower and upper brace members 26 and 27, respectively, and the mass member 30 has its end faces bonded to the resilient blocks 28 and 29.

The shock and vibration insulating unit 25 thus constructed is usually designed to be capable of absorbing and dampening vibrations with frequencies higher than about 1000 Hz. The insulating unit having the construction shown in FIG. 2 could be designed in such a manner as to be capable of taking up vibrations with frequencies of about 90 to 140 Hz which are responsible for the production of stifled, droning noises in the vehicle cabin during high-speed cruising of the vehicle. In order to design the insulating unit 25 in this fashion, however, it is required to use an extremely large-sized rigid block as the mass member 30. Such a large-sized mass member 30 could not be stably mounted between the bracket members 4 or 6 insofar as the insulating unit 25 has the shown construction.

The present invention contemplates provision of useful solutions to these drawbacks which have been inherent in prior-art engine mounting arrangements of the described natures.

DESCRIPTION OF THE EMBODIMENTS

Figure 3:
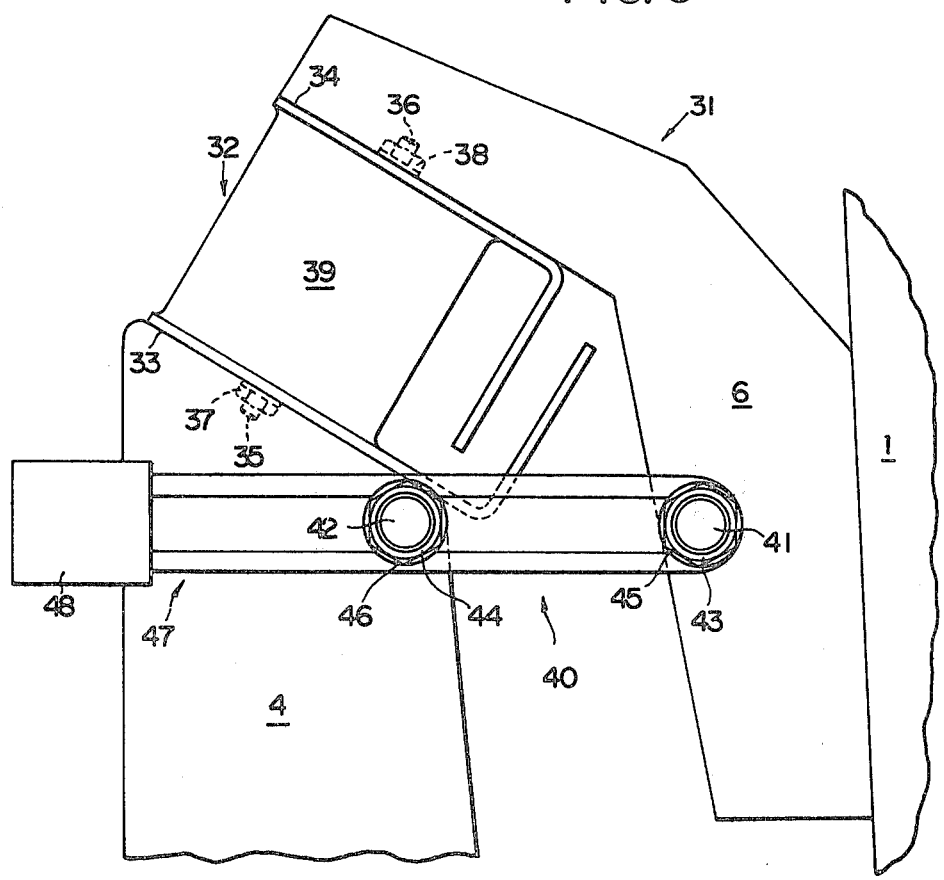
FIG. 3 is a fragmentary front elevation view showing a preferred embodiment of the engine mounting structure according to the present invention.
Figure 4:
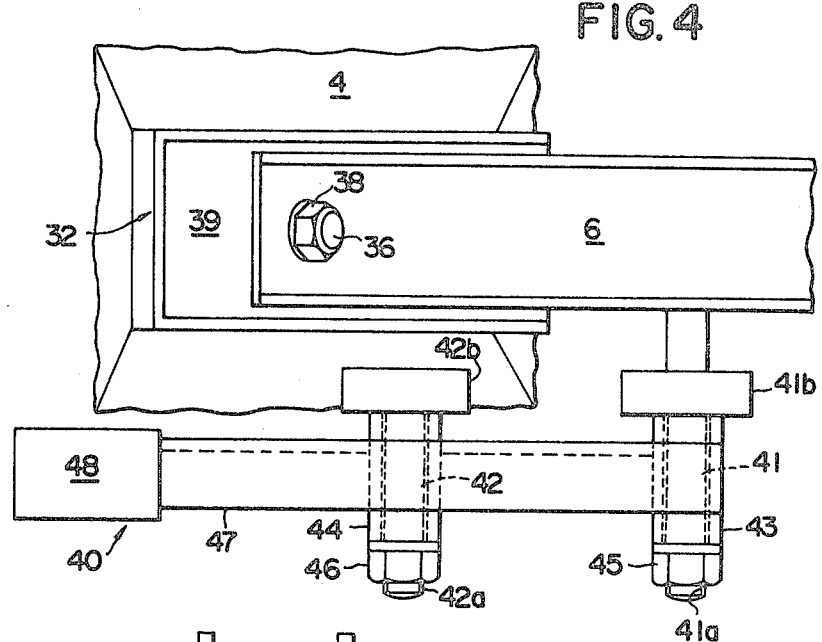
FIG. 4 is a fragmentary plan view of the engine mounting structure illustrated in FIG. 3.
Figure 5:
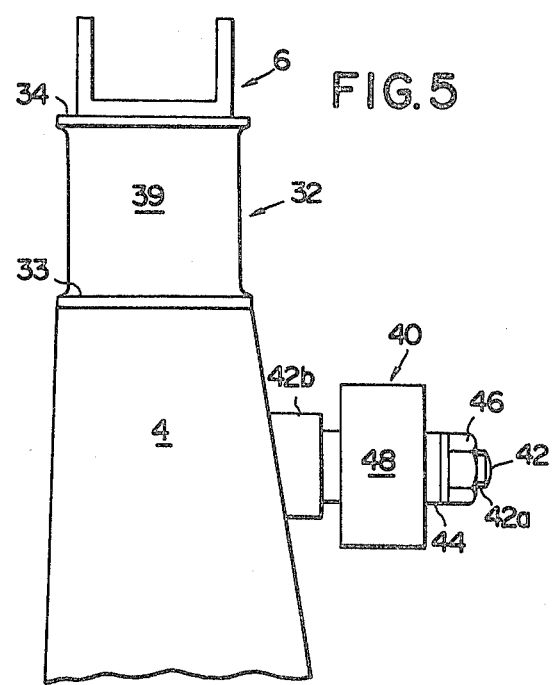
FIG. 5 is a side elevation view of the engine mounting structures illustrated in FIGS. 3 and 4.
Figure 6:
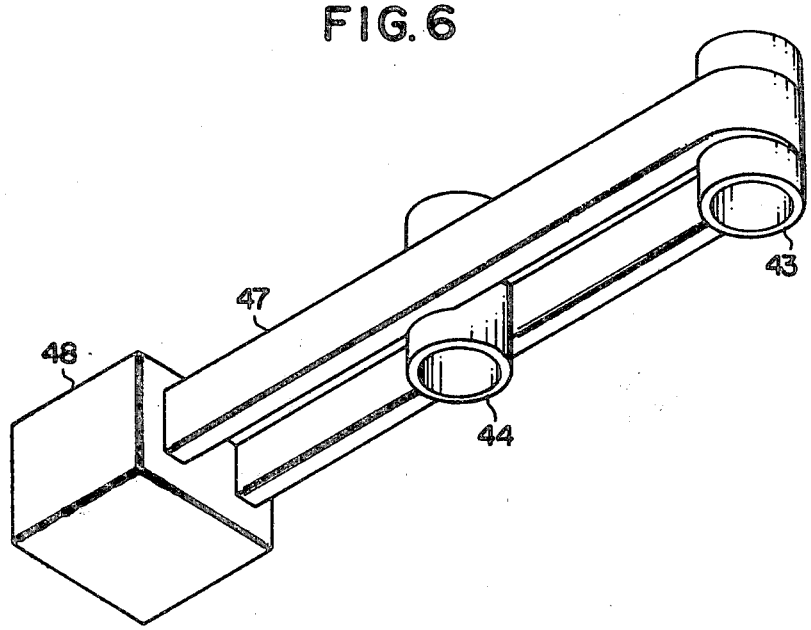
FIG. 6 is a perspective view showing the vibration cancelling device included in the engine mounting structure illustrated in FIGS. 3 to 5.
Figure 7:
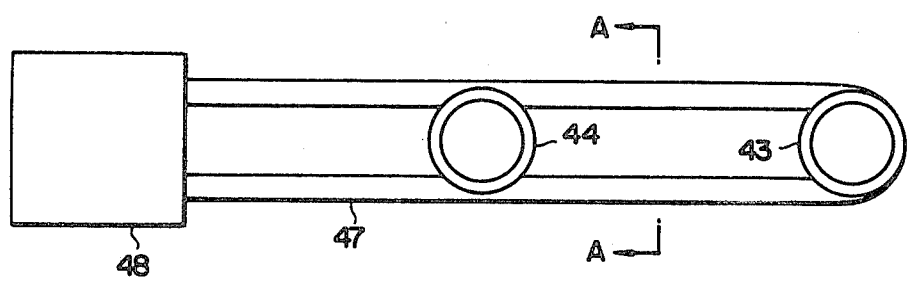
FIG. 7 is a plan view of the vibration cancelling device illustrated in FIG. 6.
Figure 8:
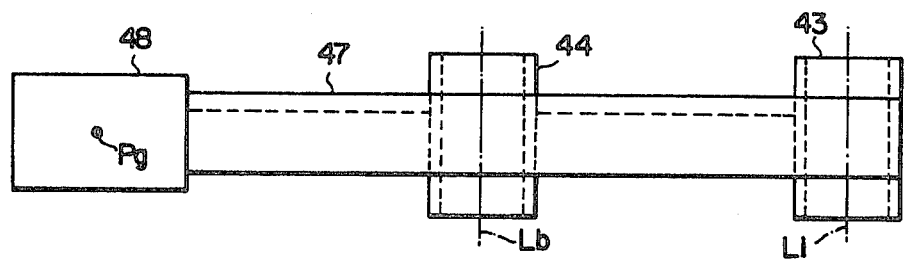
FIG. 8 is a side elevation view of the vibration cancelling device shown in FIGS. 6 and 7.

FIGS. 3 to 5 of the drawings show a first preferred embodiment of the engine mounting arrangement according to the present invention aimed at providing such solutions.

Referring first to FIGS. 3 to 5, the engine mounting arrangement embodying the present invention is used for the mounting of an automotive internal combustion engine 1 on a suitable lateral member such as a front suspension member (not shown) of the body structure of an automotive vehicle and comprises a pair of engine mounting structures respectively disposed on both sides of the engine 1. In FIGS. 3 to 5 of the drawings, only one of such engine mounting structures is shown and is represented by reference numeral 31. The other of the engine mounting structures may be similar in construction to the mounting structure 31 herein shown or may be constructed as a modification of the mounting structure 31.

The engine mounting structure 31 comprises a rigid body-side bracket member 4 positioned on one side of the engine 1 and upstanding from a longitudinal end portion of the front suspension member of the vehicle body. The body-side bracket member 4 may be welded, bolted or otherwise securely connected to or constructed as part of the suspension member and has an inclined upper face upwardly and sidewise confronting one side face of the body structure of the engine 1.

The engine mounting structure 31 further comprises a rigid engine-side bracket member 6 which is bolted, welded or otherwise secured to the body structure of the engine 1. The engine-side bracket member 6 has an inclined lower face upwardly and sidewise spaced apart substantially in parallel from the above mentioned inclined upper face of the body-side bracket member 4. In the engine mounting structure 31 shown in FIGS. 3 to 5, furthermore, the body-side and engine-side bracket members 4 and 6 have respective portions which are lhorizontally spaced apart from each other as will be best seen from FIG. 3.

The engine mounting structure 31 shown in FIGS. 3 to 5, further comprises a shock and vibration insulating unit 32 which is provided between the body-side and engine-side bracket members 4 and 6. The shock and vibration insulating unit 32 comprises rigid lower and upper brace members 33 and 34 each having an extension with an L-shaped cross section as will be seen from FIG. 3. The lower brace member 33 is securely attached to the inclined upper face of the body-side bracket member 4 by means of a bolt 35 and, likewise, the upper brace member 34 is securely attached to the inclined lower face of the engine-side bracket member 6 by means of a bolt 36. The bolt 35 is welded to the lower brace member 33 and projects downwardly and sidewise into the body-side bracket member 4 through a hole (not shown) formed in the bracket member 4. Similarly, the bolt 36 is welded to the upper brace member 34 and projects upwardly and sidewise into the engine-side bracket member 6 through a hole (not shown) formed in the bracket member 6. The bolts 35 and 36 are secured to the body-side and engine-side bracket members 4 and 6 by means of nuts 37 and 38, respectively, as indicated by broken lines in FIG. 3. The respective L-shaped extensions of the lower and upper brace members 33 and 34 project in staggered form toward the above mentioned portion of the engine-side bracket member 6.

The shock and vibration insulating unit 32 of the embodiment shown in FIGS. 3 to 5 further comprises a resilient block 39 of, for example, rubber provided between the lower and upper brace members 33 and 34 thus secured to the body-side and engine-side bracket members 4 and 6, respectively. The resilient block 39 has one end face bonded to the lower brace member 33 and another end face bonded to the upper brace member 34 so that the resilient block 39 is securely held between the brace members 33 and 34.

The above described construction of the shock and vibration insulating unit 32 is merely for the purpose of illustration and may therefore be modified as desired. Thus, the insulating unit 32 herein shown may be replaced with each of the shock and vibration insulating units 5 and 5' in the prior-art arrangement of FIG. 1 or the shock and vibration insulating unit 25 of the prior-art engine mounting structure shown in FIG. 2.

In accordance with the present invention, the engine mounting structure 31 shown in FIGS. 3 to 5 further comprises a vibration cancelling device 40 which is adapted to transmit from the engine 1 to the vehicle body structure such forces that are opposite in mode of vibration to the forces which are transmitted from the engine 1 to the vehicle body structure through the engine mounting structure 31.

Referring to FIGS. 3 to 5 and further to FIGS. 6 to 9 of the drawings, such a vibration cancelling device 40 comprises an elongated first support member or pin 41 and an elongated second support member or pin 42. The first and second support members 41 and 42 are secured each at one end to the previously mentioned horizontally spaced portions of the engine-side and body-side bracket members 4 and 6, respectively, and axially project from these portions of the bracket members 4 and 6 substantially in parallel with each other. Thus, the first and second support members 41 and 42 have respective center axes substantially parallel with each other and horizontally spaced apart a predetermined distance from each other. Furthermore, the first support member 41 has a threaded leading end portion 41a and a flange portion 41b axially spaced apart a predetermined distance from the threaded leading end portion 41a and, likewise, the second support member 42 has a threaded leading portion 42a and a flange portion 42b axially spaced apart a predetermined distance from the threaded leading end portion 42a, as shown in FIG. 4 and in part in FIG. 5. Each of the support members 41 and 42 further has a cylindrical shank portion axially intervening between the threaded leading end portion and the flange portion thereof.

The vibration cancelling device 40 further comprises cylindrically bored members or sleeves 43 and 44 respectively having the first and second support members 41 and 42 slidably received therein with the threaded leading end portions 41a and 42a of the support members 41 and 42 axially projecting outwardly from the sleeves 43 and 44, respectively, as will be best seen in FIG. 4. The sleeve 43 is axially held in position on the shank portion of the first support member 41 by means of a nut 45 engaging the threaded leading end portion 41a of the support member 41 and pressing the sleeve 43 against the flange portion 41b of the support member 41. Likewise, the sleeve 44 is axially held in position on the shank portion of the second support member 42 by means of a nut 46 engaging the threaded end portion 42a of the support member 42 and pressing the sleeve 44 against the flange portion 42b of the support member 42. The sleeves 43 and 44 are coaxially received on the first and second support members 41 and 42, respectively, and accordingly have center axes Li and Lb substantially coincident with the center axes of the support members 41 and 42, respectively. Thus, the sleeves 43 and 44 are rotatable on the support members 41 and 42 about the center axes Li and Lb, respectively, thereof.

Figure 9:
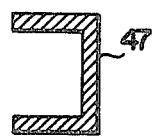
FIG. 9 is a cross section taken on a plane indicated by line A—A in FIG. 7.
Figure 10:
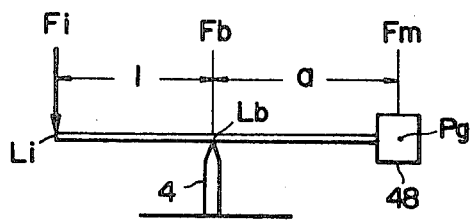
FIG. 10 is a diagram showing the vibration cancelling device in modelled form and indicating the relationship among the force or loads applied to the vibration cancelling device when the engine mounting structure illustrated in FIGS. 3 to 5 is in use on an automotive vehicle.

The vibration cancelling device 40 further comprises a rigid elongated bar 47 having a U-shaped cross section as will be best seen from FIG. 9. The elongated bar 47 has one longitudinal end portion secured to the sleeve 43 on the first support member 41 and an intermediate portion secured to the sleeve 44 on the second support member 42. Furthermore, the elongated bar 47 has fixedly or adjustably carried at its end opposite to the sleeve 43 a mass or counterweight 48 having a predetermined mass m. The counterweight member 48 is positioned with respect to the sleeve 44 on the second support member 42 in such a manner that the center of gravity Pg of the counterweight member 48 is spaced apart a predetermined distance from the center axis Lb of the sleeve 44. The ratio between the distance of the respective center axes Li and Lb of the sleeves 43 and 44 and the distance between the center axis Lb of the sleeve 44 and the center of gravity Pg of the counterweight member 48 is herein assumed to be 1 vs. a as indicated in FIG. 10 where a is a certain positive value.

When, in operation, the vehicle is cruising at relatively high speeds, booming noises resulting from vibrations with frequencies of 120 to 170 Hz tend to be produced in the vehicle cabin. If, under these conditions, the sleeves 43 and 44 on the first and second support members 41 and 42 are subjected to forces Fi and Fb, respectively, which are perpendicular to the respective center axes Li and Lb thereof, the resultant amount of deflection $x_m$ of the counterweight 48 is expressed, in terms of the amount of deflection $x_i$ of the sleeve 43, as $$x_m = -a \cdot x_i \qquad \text{Eq. 1}$$

When $x_i$ is written in the form of $x_i = X_i \cdot \cos wt$ where $w = 2\pi f$ in which f represents linear vibration frequency, this gives $$d^2(x_m)/dt^2 = a \cdot w^2 \cdot x_i \qquad \text{Eq. 2}$$

The force exerted on the counterweight member 48 at the center of gravity Pg thereof is thus given, when represented by Fm, by $$Fm = m \, d^2(x_m)/dt^2 \qquad \text{Eq. 3}$$

Substitution of Eq. 2 into Eq. 3 results in $$Fm = m \cdot a \cdot w^2 \cdot x_i = -w^2 \cdot m \cdot x_m \qquad \text{Eq. 4}$$

On the other hand, the force Fi exerted on the sleeve 43 perpendicularly to the center axis Li thereof is given by $$Fi = a \cdot Fm = a(w^2 \cdot m \cdot x_m) \qquad \text{Eq. 5}$$

The condition for equilibrium among the forces Fi, Fb and Fm is expressed in the form of $$Fi + Fb + Fm = 0 \qquad \text{Eq. 6}$$

Substitution of Eqs. 4 and 5 into Eq. 6 and solving the resultant equation for the force Fb gives $$Fb = -w^2 \cdot m \cdot a(1+a) \cdot x_i \qquad \text{Eq. 7}$$

Figure 11:
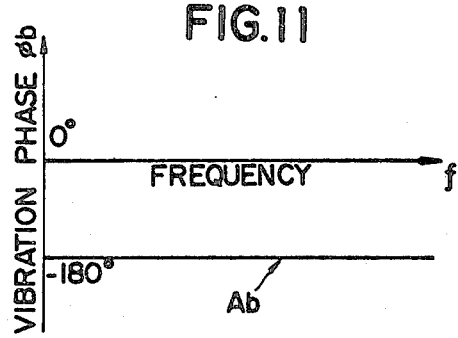
FIG. 11 is a graph showing the phase characteristic of the vibrations transmitted through the vibration cancelling device shown in modelled form in FIG. 10.
Figure 12:
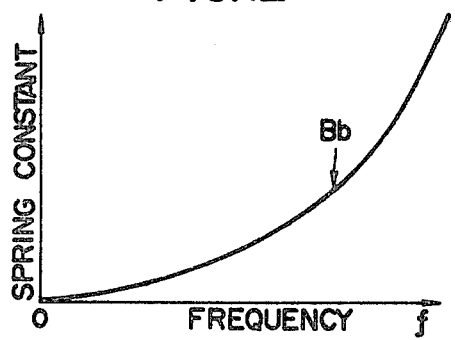
FIG. 12 is a graph showing the variation in the spring constant, in terms of vibration frequency, achieved by the vibration cancelling device illustrated in modelled form in FIG. 10.

This means, when compared with Eq. 5, that the vibration resulting from the force Fb is 180 degrees opposite in phase to the vibration resulting from the force Fi. Thus, the phase $\phi_b$ of the vibration transmitted from the engine-side bracket member 6 to the body-side bracket member 4 through the vibration cancelling device 40 is 180 degrees delayed for all frequencies from the phase of the vibration of the engine-side bracket member 6, as indicated by plot Ab in FIG. 11. In FIG. 11, the phase of the vibration resulting in the force Fi is represented by the axis of abscissa. The spring constant of the vibration cancelling device 40 thus operative is given by the absolute value of the ratio $Fb/x_i$ and is continuously variable with the vibration frequency f indicated by curve Bb in FIG. 12.

Figure 13:
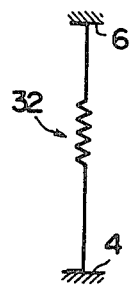
FIG. 13 is a diagram showing in modelled form the shock and vibration insulating unit also included in the engine mounting structure illustrated in FIGS. 3 to 5.

The vibrations of the engine-side bracket member 6 are transmitted to the body-side bracket member 4 not only through the above described vibration cancelling device 40 but through the previously described shock and vibration insulating unit 32 as schematically indicated in FIG. 13. If, in this instance, the spring constant of the insulating unit 32 is represented by k, the force Fk exerted on the insulating unit 32 from the engine-side bracket member 6 is, in terms of the deflection $x_i$ of the bracket member 6 as caused by the vibration transferred from the bracket member 6, given by $$Fk = k \cdot x_i \qquad \text{Eq. 8}$$

Figure 14:
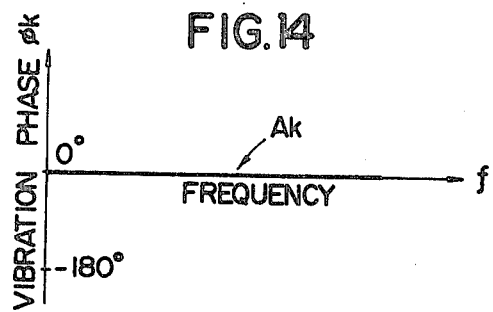
FIG. 14 is a graph similar to FIG. 11 but shows the phase characteristic of the vibrations transmitted through the shock and vibration insulating unit illustrated in modelled form in FIG. 13.
Figure 15:
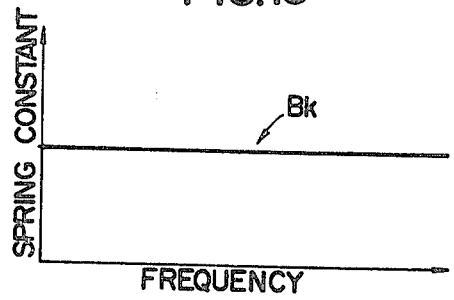
FIG. 15 is a graph similar to FIG. 12 but shows the spring constant, in terms of vibration frequency, achieved by the shock and vibration insulating unit illustrated in modelled form in FIG. 13.

Comparison of Eq. 8 with Eq. 7 shows that the vibration resulting from the force Fb exerted on the sleeve 44 on the second support member 42 is 180 degrees opposite in phase to the vibration resulting from the force Fk exerted on the insulating unit 32 from the engine-side bracket member 6. The phase $\phi_k$ of the vibration transmitted from the engine-side bracket member 6 to the body-side bracket member 4 through the shock and vibration insulating unit 32 is in phase for all frequencies with the phase of the vibration of the engine-side bracket member 6, as indicated by plot Ak in FIG. 14. The spring constant of the shock and vibration insulating unit 32 thus operative is represented by the absolute value of the ratio $Fk/x_i$ and remains constant for all vibration frequencies as indicated by plot Bk in FIG. 15.

Figure 16:
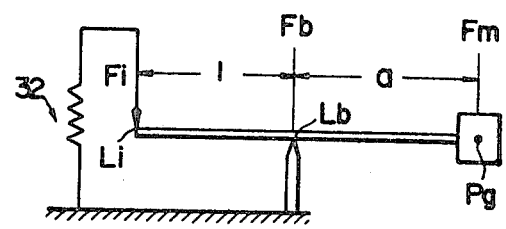
FIG. 16 is a diagram showing, in modelled form, the parallel combination of the vibration cancelling device and the shock and vibration insulating unit which are included in the engine mounting structure illustrated in FIGS. 3 to 5 and which are shown in modelled form in FIGS. 10 and 13, respectively.
Figure 17:
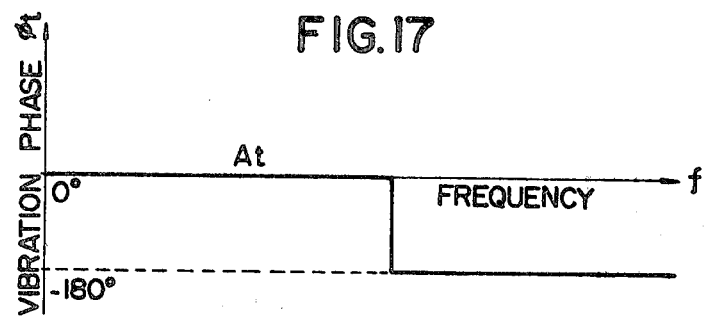
FIG. 17 is a graph also similar to FIG. 11 but shows the phase characteristic of the vibrations transmitted through the parallel combination of the vibration cancelling device and the shock and vibration insulating unit as illustrated in FIG. 16.
Figure 18:
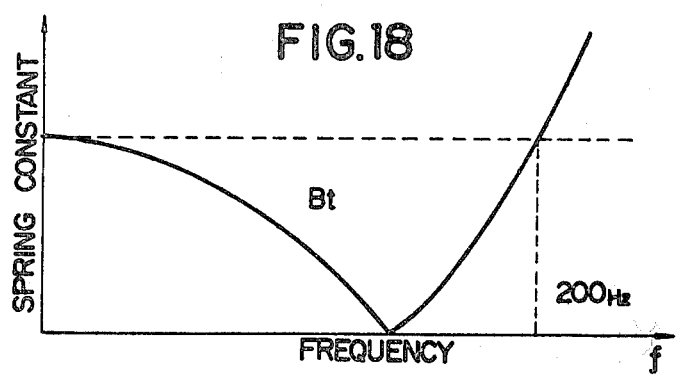
FIG. 18 is a graph also similar to FIG. 12 but shows the variation in the spring constant, in terms of vibration frequency, achieved by the combination of the vibration cancelling device and the shock and vibration insulating unit as illustrated in modelled form in FIG. 16.

Thus, the vibration resulting from the force Fb transmitted from the engine-side bracket member 6 to the body-side bracket member 4 by way of the vibration cancelling device 40 is opposite in phase to the vibration resulting from the force Fk transmitted from the bracket member 6 to the bracket member 4 through the shock and vibration insulating unit 32. The vibration cancelling device 40 in the engine mounting structure 31 embodying the present invention is arranged to bypass the shock and vibration insulating unit 32 as schematically indicated in FIG. 16 so that the vibration resulting from the force Fk transmitted to the insulating unit 32 from the engine-side bracket member 6 is at least partially offset by the vibration resulting from the force Fb transmitted from the engine-side bracket member 6 to the vibration cancelling device 40. As a consequence, the body structure of the vehicle is subjected only to the vibration resulting from the difference (Ft) between the force Fb and the force Fk. In this instance, the phase $\phi_t$ of the vibration transmitted through the parallel combination of the shock and vibration insulating unit 32 and the vibration cancelling device 40 to the vehicle body structure varies with the vibration frequency f as indicated by plot At in FIG. 17. On the other hand, the spring constant available of such a combination is given by the absolute value of the ratio $Ft/x_i$ and is variable with the vibration frequency f as indicated by curve Bt in FIG. 18. From the curve Bt in FIG. 18, it will be seen that the total or equivalent spring constant available in the engine mounting structure 31 assumed considerably small values for relatively low vibration frequencies so that production of stifled, droning noises in the vehicle cabin can be inhibited successfully.

If the internal combustion engine 1 is of the type having four power cylinders and tends to produce booming noises at vibration frequencies of about 120 to 170 Hz, it is preferable that the mass m of the counterweight member 48 and/or the value a in the ratio 1:a be selected so that the value of $m \cdot (1+a) \cdot a$ ranges from about 100 grams to about 600 grams so as to reduce the total or equivalent spring constant of the engine mounting structure in response to vibrations at such frequencies.

Figure 19:
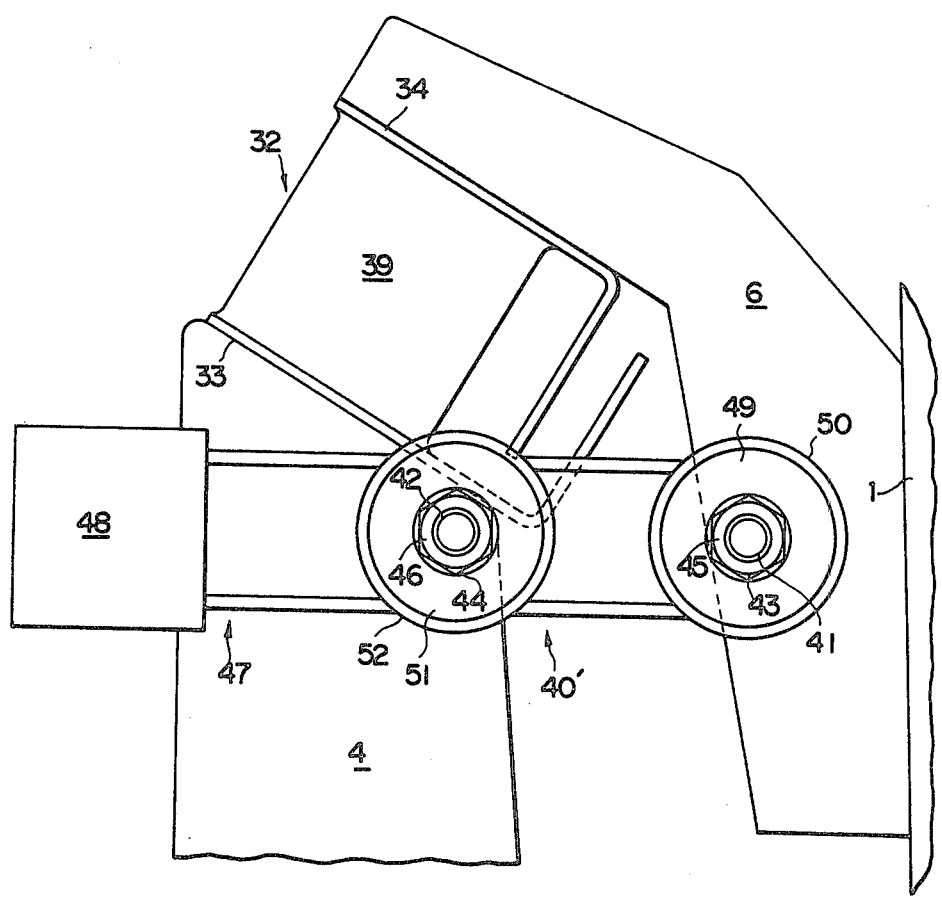
FIG. 19 is a fragmentary front elevation view showing a modification of the embodiment illustrated in FIGS. 3 to 5.
Figure 20:
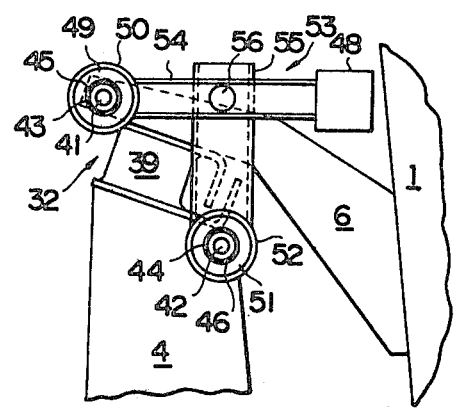
FIG. 20 is a fragmentary front elevation view showing another preferred embodiment of the engine mounting structure according to the present invention.
Figure 21:
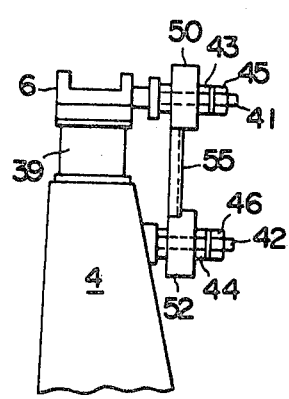
FIG. 21 is a side elevation view of the engine mounting structure illustrated in FIG. 20.
Figure 22:
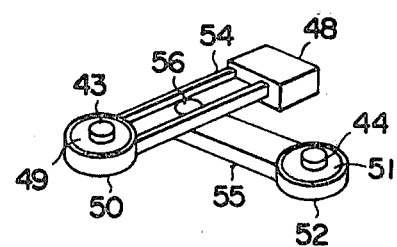
FIG. 22 is a perspective view showing the vibration cancelling device included in the engine mounting structure illustrated in FIGS. 20 and 21.

FIG. 19 shows a modification of the embodiment of the engine mounting structure hereinbefore described with reference to FIGS. 3 to 9. The modified embodiment shown in FIG. 19 is characterized by the construction of a vibration cancelling device now designated in its entirety by reference numeral 40'. The vibration cancelling device 40' comprises first and second support members 41 and 42, sleeves 43 and 44, nuts 45 and 46, a rigid elongated bar 47 and a counterweight member 48. These component members 41 to 48 of the vibration cancelling device 40' are per se constructed and arranged essentially similarly to their respective counterparts in the embodiment of FIGS. 3 to 9, except in that the sleeves 43 and 44 are not directly engaged by the elongated bar 47. In the modified embodiment of FIG. 19, the sleeve 43 on the first support member 41 is used as an inner rigid sleeve in combination with an intermediate resilient sleeve 49 and an outer rigid sleeve 50 and, likewise, the sleeve 44 on the second support member 42 is used as an inner rigid sleeve in combination with an intermediate resilient sleeve 51 and an outer rigid sleeve 52.

The inner rigid sleeve 43 on the first support member 41 is coaxially received in the intermediate resilient sleeve 49, which in turn is coaxially received in the outer rigid sleeve 50. Likewise, the inner rigid sleeve 44 on the second support member 42 is coaxially received in the intermediate resilient sleeve 51, which in turn is coaxially received in the outer rigid sleeve 52. Thus, the intermediate resilient sleeve 49 has its inner peripheral surface attached to the outer peripheral surface of the inner rigid sleeve 43 on the first support member 41 and its outer peripheral surface attached to the inner peripheral surface of the outer rigid sleeve 50. Similarly, the intermediate resilient sleeve 51 has its inner peripheral surface attached to the outer peripheral surface of the inner sleeve 44 on the second support member 42 and its outer peripheral surface attached to the inner peripheral surface of the outer rigid sleeve 52. The elongated bar 47 has one longitudinal end portion secured to the outer rigid sleeve 50 carried by the first support member 41 and an intermediate portion secured to the outer rigid sleeve 52 carried by the second support member 42. These rigid sleeves 50 and 52 and the counterweight member 48 carried at the opposite end of the elongated bar 47 to the rigid sleeve 50 on the first support member 41 are positioned with respect to one another so that the distance between the respective center axes of the inner rigid sleeves 43 and 44 and the distance between the center axis of the sleeve 44 and the center of gravity of the counterweight member 48 are in the previously mentioned ratio of 1 vs. a.

With the construction of the vibration cancelling device 40' thus constructed and arranged, not only the elongated bar 47 is enabled to slightly turn about the respective center axes of the first and second support members 41 and 42 in response to vibratory motions of the engine-side bracket member 6 but also the load to be transmitted from the engine-side bracket member 6 to the body-side bracket member 4 through the vibration cancelling device 40' can be effectively attenuated by the elasticity of each of the intermediate resilient sleeves 49 and 51. Each of the resilient sleeves 49 and 51 is preferably constructed of a relatively hard elastic material which will exhibit a resonance frequency not less than 200 Hz.

FIGS. 20 to 24 show another preferred embodiment of the engine mounting structure according to the present invention. The engine mounting structure herein shown is characterized by a vibration cancelling device 53 which is constructed and arranged so that the swaying or rolling motions of the body structure of an engine 10 in a lateral direction thereof are prevented or restrained from being transferred to the body structure of the vehicle. In the embodiment shown in FIGS. 20 to 24, such a vibration cancelling device 53 is assumed, by way of example, to be provided in combination with a shock and vibration insulating unit 32 which per se is constructed and arranged between a body-side bracket member 4 and an engine-side bracket member 6 similarly to its counterpart in the embodiment described with reference to FIGS. 3 to 9.

The vibration cancelling device 53 comprises elongated first and second support members or pins 41 and 42 which are secured each at one end to the engine-side and body-side bracket members 6 and 4, respectively. The support members 41 and 42 axially project from the bracket members 6 and 4, respectively, substantially in parallel with each other and have respective center axes which are located in such a manner as to respectively lie in upper and lower horizontal planes vertically spaced apart from each other and in vertical planes horizontally spaced apart from each other, as will be seen from FIGS. 20 and 23. As will be best seen from FIG. 21, furthermore, each of the first and second support members 41 and 42 has a threaded leading end portion, a flange portion axially spaced apart from the threaded end portion and a cylindrical shank portion axially intervening between the threaded end portion and the flange portion.

The vibration cancelling device 53 of the engine mounting structure shown in FIGS. 20 to 24 further comprises inner rigid sleeves 43 and 44 coaxially received on and circumferentially slidable on the outer peripheral surface of the respective shank portions of the first and second support members 41 and 42. The inner rigid sleeve 43 is axially held in position on the shank portion of the first support member 41 by means of a nut 45 and, likewise, the inner rigid sleeve 44 is axially held in position on the shank portion of the second support member 42 by means of a nut 46. The inner rigid sleeves 43 and 44 are coaxially received in intermediate resilient sleeves 49 and 51, respectively. These intermediate resilient sleeves 49 and 51 in turn are coaxially received in outer rigid sleeves 50 and 52, respectively.

The vibration cancelling device 53 further comprises rigid first and second elongated bars 54 and 55 each having a U-shaped cross section. The first elongated bar 54 has one end portion secured to the outer rigid sleeve 50 carried by the first support member 41 and, likewise, the second elongated bar 55 has one end portion secured to the outer rigid sleeve 52 carried by the second support member 42. The first and second elongated bars 54 and 55 are, thus rotatable about the center axes of the first and second support members 41 and 42, respectively, which are secured to the engine-side and body-side bracket members 6 and 4. The first elongated bar 54 is directed substantially horizontally from the first support member 41 and the second elongated bar 55 is directed upwardly from the second support member 42 so that the first and second elongated bars 54 and 55 longitudinally extend perpendicularly in a non-intersecting relationship to each other. The first elongated bar 54 has a mass or counterweight member 48 carried at its end opposite to the first support member 41.

Furthermore, the second elongated bar 55 is pivotally connected to an intermediate portion of the first elongated bar 54 by suitable pivot means such as a pivot member or pin 56 rotatably received in part in a hole formed in the first elongated bar 54 and in part in a hole formed in the second elongated bar 55, as will be best seen from FIG. 24. The pivot member 56 has a head portion received on one face of the second elongated bar 55 and a threaded leading end portion axially projecting from the hole in the first elongated member 54. The pivot member 56 is thus prevented from being disengaged from the bars 54 and 55 by means of the head portion thereof and a nut 57 engaging the threaded leading end portion of the pivot member 56.

The vibration cancelling device 53 constructed and arranged as described above is not only operable similarly to the vibration cancelling device 40 in the embodiment of FIGS. 3 to 9 or the vibration cancelling device 40' in the embodiment of FIG. 19 but is capable of absorbing lateral movements of the body structure of the engine 1 by the angular displacement between the first and second elongated bars 54 and 55 about the center axis of the pivot member 56 intervening between the bars 54 and 55.

Figure 25:
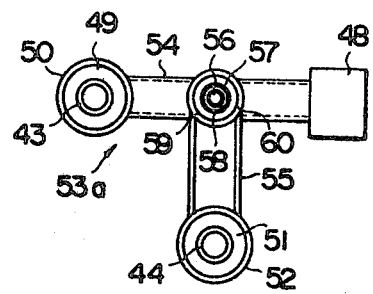
FIG. 25 is a view similar to FIG. 23 but shows a modification of the vibration cancelling device included in the engine mounting structure illustrated in FIGS. 20 and 21.
Figure 26:
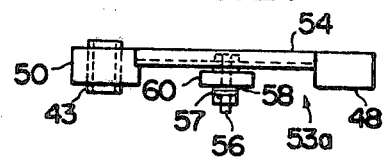
FIG. 26 is an upper end view of the vibration cancelling device illustrated in FIG. 25.

FIGS. 25 and 26 show a modification of the vibration cancelling device 53 hereinbefore described with reference to FIGS. 20 to 24. In the vibration cancelling device illustrated in FIGS. 25 and 26 in which the device as a whole is designated by 53a, the pivot means providing the pivotal engagement between the first and second elongated bars 54 and 55 comprises a pivot member or pin 56, a nut 57, an inner rigid sleeve 58, an intermediate resilient sleeve 59 and an outer rigid sleeve 60. The pivot member 56 is rotatably received in part in a hole formed in the first elongated bar 54 and in part in a hole formed in the second elongated bar 55 and has a head portion at one end and a threaded end portion adjacent to the other end thereof. The inner rigid sleeve 58 is coaxially received and circumferentially slidable on a shank portion between the head and threaded end portions of the pivot member 56. The intermediate resilient sleeve 59 is formed of, for example, rubber and is coaxially received on the outer peripheral surfaces of the inner rigid sleeve 58 and is, in turn, coaxially received in the outer rigid sleeve 60. The inner rigid sleeve 58 is axially held in position on the pivot member 56 by means of the nut 57 engaging the threaded end portion of the pivot member 56.

Figure 27:
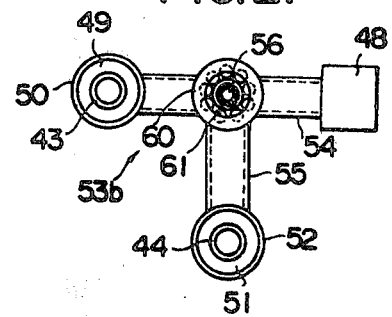
FIG. 27 is a view also similar to FIG. 23 but shows another modification of the vibration cancelling device included in the engine mounting structure illustrated in FIGS. 20 and 21.
Figure 28:
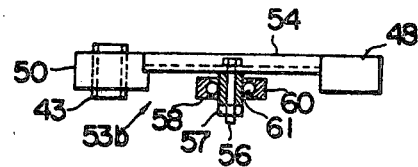
FIG. 28 is an upper end view of the vibration cancelling device illustrated in FIG. 27.
Figure 30:
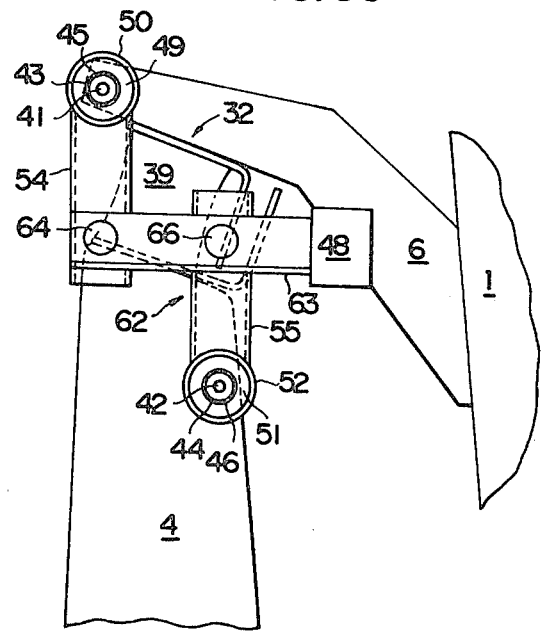
FIG. 30 is a fragmentary front elevation view showing still another preferred embodiment of the engine mounting structure according to the present invention.
Figure 31:
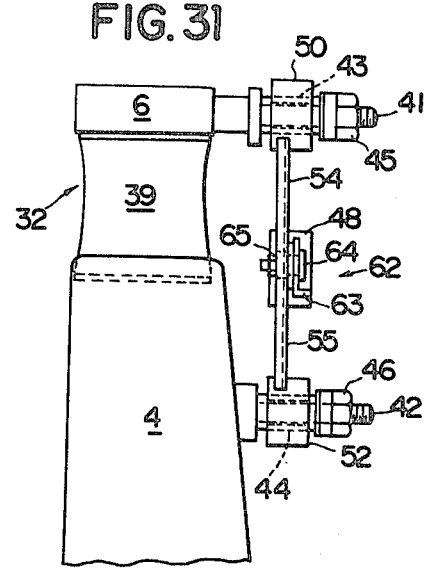
FIG. 31 is a side elevation view of the engine mounting structure illustrated in FIG. 30.
Figure 32:
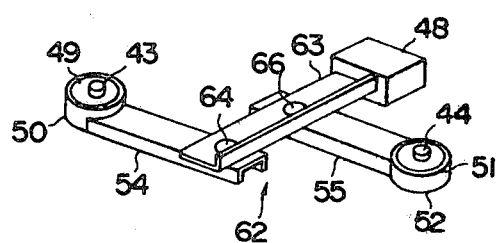
FIG. 32 is a perspective view showing the vibration cancelling device included in the engine mounting structure illustrated in FIGS. 30 and 31.
Figure 33:
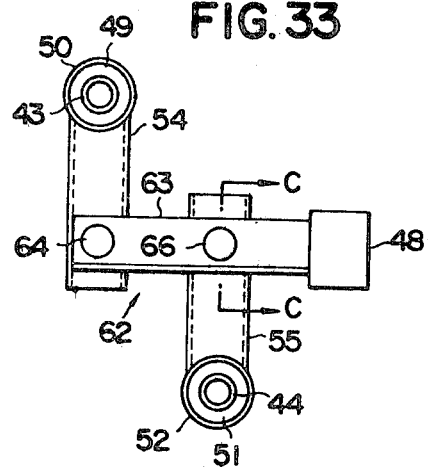
FIG. 33 is a front elevation view of the vibration cancelling device illustrated in FIG. 32.
Figure 34:
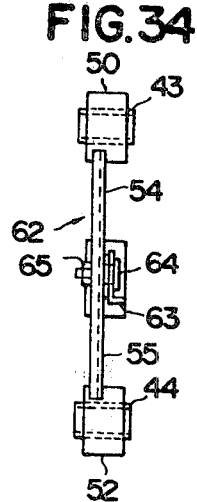
FIG. 34 is a side elevation view of the vibration cancelling device illustrated in FIGS. 32 and 33.
Figure 35:
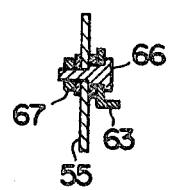
FIG. 35 is a cross sectional view which is taken on a vertical plane indicated by line C—C in FIG. 33.

FIGS. 27 and 28 show a further modification of the vibration cancelling device 53a constructed as above described. In the vibration cancelling device shown in FIGS. 27 and 28 in which the device as a whole is designated by 53b, the inner and outer rigid sleeves 58 and 60 constitute inner and outer race members of a ball bearing assembly which, thus, further comprises a plurality of rigid ball elements 61 rollably interposed between the inner and outer race members 56 and 60.

Turning to FIG. 29 of the drawings, there is shown still another preferred embodiment of the engine mounting structure according to the present invention. The embodiment herein shown in characterized by a vibration cancelling device 53c which is a further modification of the embodiment shown in FIGS. 20 to 24 and, thus, comprises first and second support members 41 and 42, inner rigid members 43 and 44, nuts 45 and 46, intermediate resilient sleeves 49 and 51, and outer rigid sleeves 50 and 52, which are all constructed and arranged similarly to their respective counterparts of the embodiment of FIGS. 20 to 24.

The vibration cancelling device 53c of the engine mounting structure shown in FIG. 29 further comprises rigid first and second elongated bars 54 and 55 each having a U-shaped cross section. The first elongated bar 54 has one end secured to the outer rigid sleeve 50 carried by the first support member 41 while the second elongated bar 55 has an intermediate portion secured to the outer rigid sleeve 52 carried by the second support member 42. The first and second elongated bars 54 and 55 are thus also rotatable about the center axes of the first and second support members 41 and 42, respectively, secured to the engine-side and body-side bracket members 6 and 4, similarly to their respective counterparts in the embodiment of FIGS. 20 to 24.

In the embodiment of FIG. 29, the first elongated bar 54 is directed substantially downwardly from the first support member 41 and the second elongated bar 55 extends substantially horizontally in opposite directions from the second support member 42. Thus, the first and second elongated bars 54 and 55 have end portions which are perpendicular in a nonintersecting relationship to each other and are pivotally connected between these end portions by suitable pivot means. The pivot means is shown comprising a pivot member or pin 56 which is rotatably received in part in a hole formed in the first elongated bar 54 and in part in a hole formed in the second elongated bar 55. The pivot member 57 has a head portion at one end and a threaded end portion adjacent to the other end thereof and is prevented from being disengaged from the elongated bars 54 and 55 by means of the head portion contacting one of the bars and a nut (not shown) engaging the threaded end portion of the pivot member 57 and contacting the other of the bars. The second elongated bar 55 has a mass or counterweight member 48 carried at its end opposite to the pivot member 56.

The vibration cancelling device 53c of the embodiment shown in FIG. 29 is, thus, adapted to absorb swaying, rolling or other lateral displacements of the body structure of the engine by the angular displacement between the first and second elongated bars 54 and 55 about the center axis of the pivot member 56.

FIGS. 30 to 35 show still another preferred embodiment of the engine mounting structure embodying the present invention. The embodiment of the engine mounting structure herein shown is characterized by a vibration cancelling device 62 which is constructed as a modification in part of the vibration cancelling device 53 shown in FIGS. 20 to 24 and in part of the vibration cancelling device 53c shown in FIG. 29. Thus, the vibration cancelling device 62 of the embodiment shown in FIGS. 30 to 35 comprises first and second support members 41 and 42, inner rigid sleeves 43 and 44, nuts 45 and 46, intermediate resilient sleeves 49 and 51, and outer rigid sleeves 50 and 52, which are all constructed and arranged similarly to their counterparts in the embodiment of FIGS. 20 to 24 and the embodiment of FIG. 29.

The vibration cancelling device 62 of the engine mounting structure shown in FIGS. 30 to 34 further comprises rigid first, second and third elongated bars 54, 55 and 63 each having a U-shaped cross section. The first elongated bar 54 has one end portion secured to the outer rigid sleeve 50 carried by the first support member 41 and, likewise, the second elongated bar 55 has one end portion secured to the outer rigid sleeve 52 carried by the second support member 42. The first and second elongated bars 54 and 55 are, thus, rotatable about the center axes of the first and second support members 41 and 42, respectively, which are secured to the engine-side and body-side bracket members 6 and 4. The first elongated bar 54 is directed downwardly from the first support member 41 and the second elongated member 55 is directed upwardly from the second support member 42. The first and second elongated bars 54 and 55 extend in part in parallel with each other and have respective leading end portions which are horizontally spaced apart from each other.

The third elongated bar 63 has one end portion perpendicular in non-intersecting relationship to a lower end portion of the first elongated bar 54 and pivotally connected to the lower end portion by first pivot means. The third elongated bar 63 further has an intermediate portion extending perpendicularly in a non-intersecting relationship to an upper end portion of the second elongated bar 55 and pivotally connected to the upper end portion by second pivot means. The third elongated bar 63 has a mass or counterweight member 48 carried at its end opposite to the first pivot means across the second pivot means.

The first pivot means providing pivotal connection between the first and third elongated bars 54 and 63 comprises a pivot member or pin 64 which extends in part through a hole formed in the first elongated bar 54 and in part through a first hole formed in the third elongated bar 63. The pivot member 61 has a head portion received on one face of the third elongated bar 63 and a threaded leading end portion axially projecting from the hole in the first elongated bar 54, as will be best seen from FIG. 31. The pivot member 64 is prevented from being disengaged from the bars 54 and 63 by the head portion thereof and a nut 65 engaging the threaded leading end portion of the pivot member 64.

On the other hand, the second pivot means providing pivotal connection between the second and third elongated bars 55 and 63 comprises a pivot member or pin 66 extending in part through a hole formed in the second elongated bar 55 and in a second hole formed in the third elongated bar 63. The pivot member 66 has a head portion received on the above mentioned face of the third elongated bar 63 and a threaded leading end portion axially projecting from the second hole in the third elongated bar 63, as will be best seen from FIG. 34. The pivot member 66 is prevented from being disengaged from the second and third elongated bars 55 and 63 by the head portion thereof and a nut 67 engaging the threaded leading end portion of the pivot member 66.

The vibration cancelling device 62 of the embodiment of the engine mounting structure shown in FIGS. 30 to 35 is thus substantially free from the load from the engine 1 and, for this reason, each of the intermediate resilient sleeves 49 and 51 may be constructed by a relatively small sizes member of, for example, rubber. Furthermore, each of these resilient sleeves 49 and 50 may be formed with a notch so as to lessen the weight of the sleeve and may be bonded to the respective outer and inner peripheral surfaces of the inner and outer rigid sleeves fitted to the resilient sleeve.

It will have been appreciated from the foregoing description that the engine mounting structure proposed by the present invention is advantageous for reducing the stifled, booming noises to be produced in the vehicle cabin especially during high-speed cruising of the vehicle. Such an advantage is achieved by the combination of the shock and vibration unit provided between the body structure of the engine and the body structure of the vehicle and the vibration cancelling device provided operatively in parallel with the shock and vibration insulating unit. The vibration cancelling device is characterized, among other things, by the construction in which the sole elongated bar or one of the two or three elongated bars has one end portion pivotally engaged by the body structure of the engine, a longitudinally intermediate portion pivotally engaged by the body structure of the vehicle and another end portion carrying a mass member having a predetermined weight.

When the elongated bar or one of the elongated bars is pivotally engaged by each of the body structure of the engine and the body structure of the vehicle through the intermediary of a resilient member as in some of the embodiments hereinbefore described, not only the vibration cancelling device can be easily assembled to permit the elongated bar or bars to turn in response to high-frequency vibrations but the device is capable of efficiently dampening high-frequency vibrations as well as low-frequency to high-frequency vibrations transmitted from the engine throughout operation of the engine.

What is claimed is:

1. An engine mounting structure for mounting an automotive engine on the body structure of an automotive vehicle, comprising:
    a first bracket member to be connected to the body structure of the engine,
    a second bracket member to be connected to the body structure of the vehicle and spaced apart from the first bracket member,
    a shock and vibration insulating unit structurally intervening between the first and second bracket members and including at least one resilient block, and
    a vibration cancelling device comprising rigid first and second elongated members, the first elongated member having one end portion pivotally connected to said first bracket member and the second elongated member having an end portion pivotally connected to said second bracket member, said first elongated member having a longitudinally intermediate portion pivotally connected to the second elongated member, and a mass member connected to another end portion of said first elongated member.

2. An engine mounting structure for mounting an automotive engine on the body structure of an automotive vehicle, comprising:
    a first bracket member to be connected to the body structure of the engine,
    a second bracket member to be connected to the body structure of the vehicle and spaced apart from the first bracket member,
    a shock and vibration insulating unit structurally intervening between the first and second bracket members and including at least one resilient block, and
    a vibration cancelling device comprising rigid first and second elongated members, the first elongated member having one end portion pivotally connected to said first bracket member and the second elongated member having a longitudinally intermediate portion pivotally connected to said second bracket member and one end portion pivotally connected to another end portion of said first elongated member, and a mass member connected to another end portion of said second elongated member.

3. An engine mounting structure as set forth in either of claims 1 or 2, in which said vibration cancelling device further comprises pivot means providing pivotal connection between said first and second elongated members, said pivot means comprising a pivot member being in engagement with the first and second elongated members and being rotatable about the center axis thereof with respect to at least one of the first and second elongated members.

4. An engine mounting structure as set forth in claim 3, in which said pivot means further comprises an inner rigid sleeve circumferentially slidable on said pivot member, a resilient sleeve coaxially received on said inner rigid sleeve, and an outer rigid sleeve coaxially received on said resilient sleeve and securely connected to one of said first and second elongated members.

5. An engine mounting structure as set forth in claim 3, in which said pivot means further comprises a bearing assembly having an inner race member coaxially received on said pivot member, an outer race member securely connected to one of said first and second elongated members and radially outwardly spaced apart from said inner race member, and a plurality of rigid ball elements rollable between the inner and outer race members.

6. An engine mounting structure for mounting an automotive engine on the body structure of an automotive vehicle, comprising:
    a first bracket member to be connected to the body structure of the engine,
    a second bracket member to be connected to the body structure of the vehicle and spaced apart from the first bracket member,
    a shock and vibration insulating unit structurally intervening between the first and second bracket members and including at least one resilient block, and
    a vibration cancelling device comprising rigid first, second, and third elongated members, the first elongated member having one end portion pivotally connected to said first bracket member, the second elongated member having one end portion pivotally connected to said second bracket member, the third elongated member having one end portion pivotally connected to another end portion of said first elongated member and a longitudinally intermediate portion pivotally connected to another end portion of said second elongated member, and a mass member connected to another end portion of said third elongated member.

7. An engine mounting structure as set forth in any of claims 1, 2, or 6, in which said vibration cancelling device further comprises an elongated first support member secured to said first bracket member, an elongated second support member secured to said second bracket member, a rigid sleeve circumferentially slidable on said first support member, and a rigid sleeve circumferentially slidable on said second support member, the rigid sleeve on the first support member being securely held in engagement with said one end portion of said first elongated member and the rigid sleeve on the second support member being securely held in engagement with said end portion of said second elongated member.

8. An engine mounting structure as set forth in claim 7, in which said vibration cancelling device further comprises a first resilient sleeve coaxially received on the rigid sleeve on said first support member, a second resilient sleeve on the rigid sleeve on said second support member, an outer rigid sleeve coaxially received on said first resilient sleeve and an outer rigid sleeve coaxially received on said second resilient sleeve, the outer rigid sleeve on said first resilient sleeve being securely connected to said one end portion of said first elongated member and the outer rigid sleeve on said second resilient sleeve being securely connected to said second elongated member.

* * * * *